(12) United States Patent
Ramirez Gonzalez et al.

(10) Patent No.: US 11,313,777 B2
(45) Date of Patent: Apr. 26, 2022

(54) REDUCTION OF ERROR IN TESTING FRICTION AND WEAR WITH THE USE OF HIGH-SPEED RECIPROCATING MOTION

(71) Applicant: Bruker Nano, Inc., San Jose, CA (US)

(72) Inventors: Jair Giovanni Ramirez Gonzalez, San Jose, CA (US); Vladimir Gulkov, San Jose, CA (US); Steven J. Shaffer, San Jose, CA (US); Douglas Werner, San Jose, CA (US)

(73) Assignee: BRUKER NANO INC., San Jose, CA (US)

( * ) Notice: Subject to any disclaimer, the term of this patent is extended or adjusted under 35 U.S.C. 154(b) by 287 days.

(21) Appl. No.: 16/775,776

(22) Filed: Jan. 29, 2020

(65) Prior Publication Data

US 2020/0249140 A1 Aug. 6, 2020

Related U.S. Application Data

(60) Provisional application No. 62/799,767, filed on Feb. 1, 2019.

(51) Int. Cl.
*G01N 3/56* (2006.01)
*F16C 17/24* (2006.01)
*G01M 13/04* (2019.01)

(52) U.S. Cl.
CPC ............ *G01N 3/56* (2013.01); *F16C 17/246* (2013.01); *G01M 13/04* (2013.01); *G01N 2203/0032* (2013.01)

(58) Field of Classification Search
CPC ............ G01N 3/56; G01N 19/00; G01N 19/02
See application file for complete search history.

(56) References Cited

U.S. PATENT DOCUMENTS

| | | | |
|---|---|---|---|
| 5,052,219 A * | 10/1991 | Fery | G01N 11/10 73/152.22 |
| 6,418,776 B1 | 7/2002 | Gitis et al. | |
| 9,752,969 B2 | 9/2017 | Werner et al. | |
| 2011/0000278 A1* | 1/2011 | Padgurskas | G01N 3/56 73/9 |
| 2013/0047699 A1* | 2/2013 | Padgurskas | G01N 19/02 73/7 |
| 2018/0202912 A1* | 7/2018 | Vinogradov-Nurenberg | A47J 37/0786 |

* cited by examiner

*Primary Examiner* — Eric S. McCall
(74) *Attorney, Agent, or Firm* — Quarles & Brady LLP; Yakov S. Sidorin

(57) ABSTRACT

System for conducting measurements of friction of a chosen material with reduced errors. The system includes a sample holder, a bushing accommodating such holder while permitting reversible repositioning of the holder along a bushing axis, a horizontal force sensor, a vertical force sensor, a sample holder pusher and a subsystem including a linear vertical bearing (disposed in the bushing and separating the holder from the bushing) and/or a horizontally-sliding element between the rod pusher and the vertical force sensor. The subsystem is structured to reduce a rocking motion of the holder in the bushing caused by a relative motion between the sample and an auxiliary body brought in contact with the sample. The method for performing measurements with such system.

13 Claims, 15 Drawing Sheets

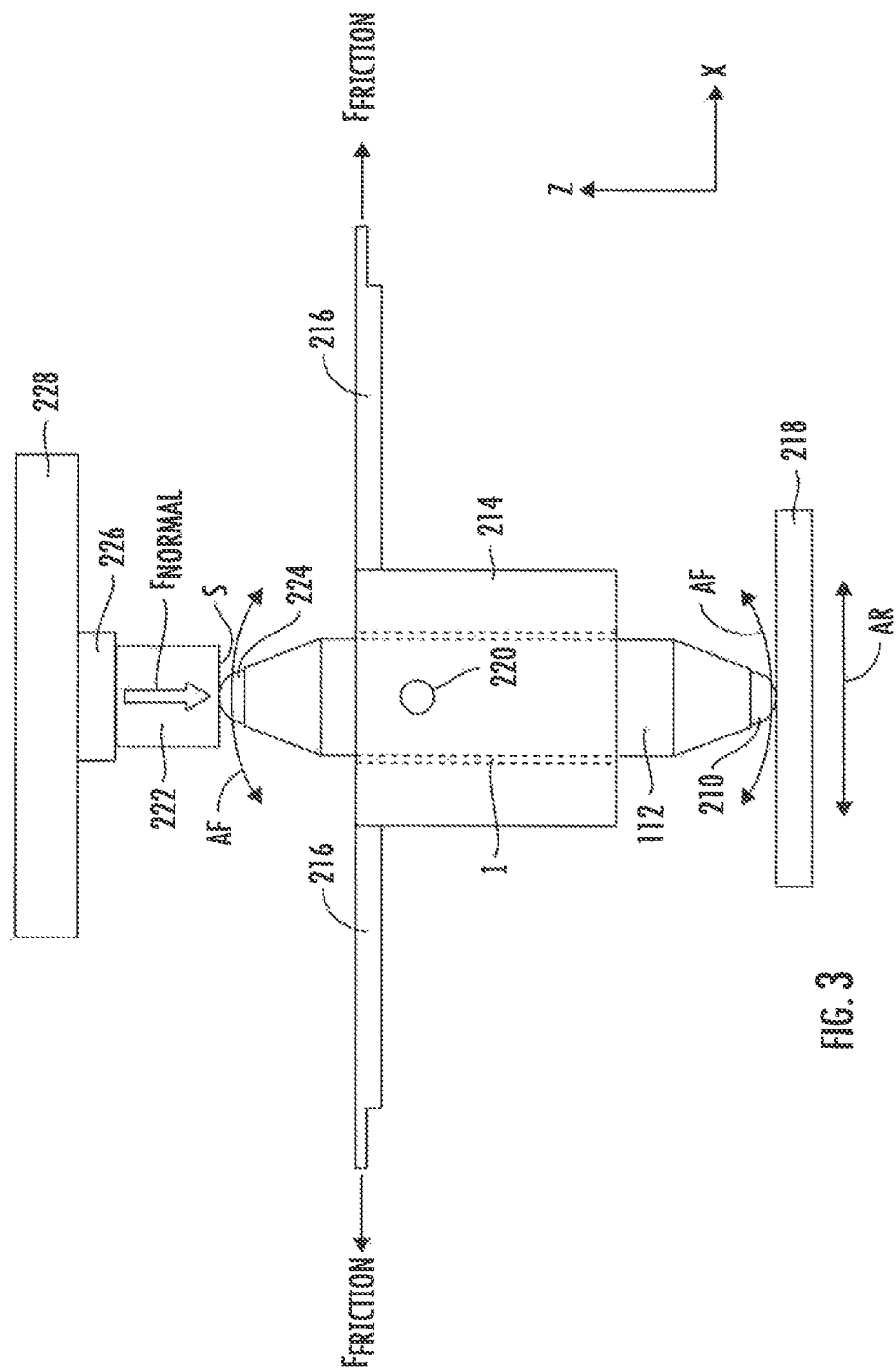

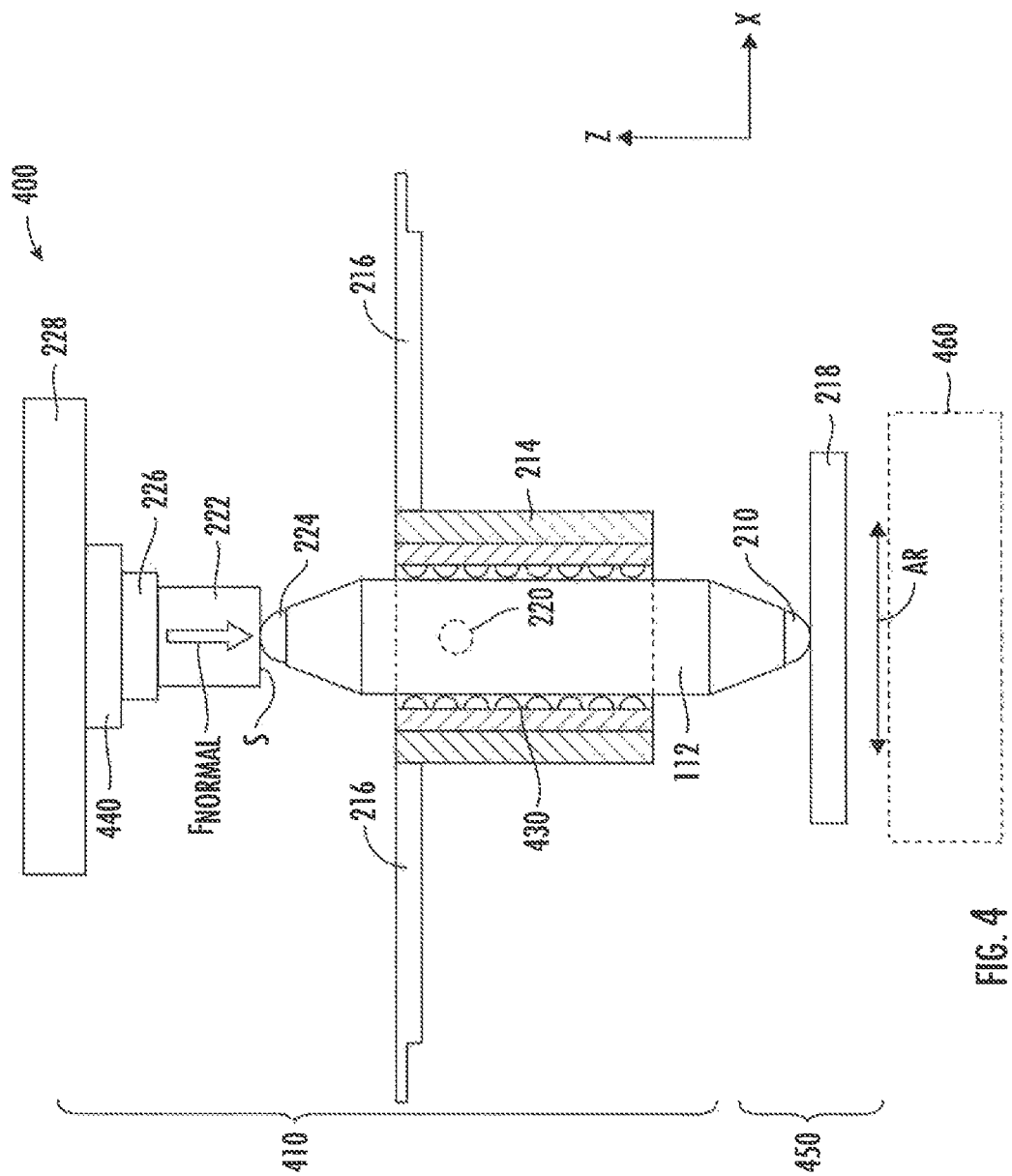

| ITEM | DESCRIPTION |
|---|---|
| 1 | BASE, SENSOR ASSEMBLY |
| 2 | BRACKET |
| 3 | SENSOR BEAM |
| 4 | SCREW |
| 5 | WASHER |
| 6 | SPRING LOCK WASHER |
| 7 | SENSOR HOUSING |
| 8 | SCREW |
| 9 | SCREW |
| 10 | SCREW |
| 11 | STRIKE |
| 12 | SCREW |
| 13 | FORCE SENSOR |
| 14 | SENSOR HOUSING CAP |
| 15 | FRONT HOUSING |
| 16 | INSERT |
| 17 | NUT |
| 18 | STRUCTURAL CONNECTOR |
| 19 | SENSOR HOUSING |
| 20 | SHAFT |
| 21 | SCREW |
| 22 | LONG SPACER |
| 23 | SLIDER BASE |
| 24 | HARD PUSHER |
| 25 | SLEEVE BEARING |
| 26 | FIXED ALIGNMENT BEARING |
| 27 | SCREW |
| 28 | SCREW |
| 29 | SETSCREW |
| 30 | SCREW |
| 31 | LINEAR STAGE |
| 32 | SCREW |
| 33 | SCREW |
| 34 | SCREW |
| 35 | SCREW |
| 36 | NUT |
| 37 | HOUSING |
| 38 | SCREW |
| 39 | SCREW |
| 40 | PRINTED CIRUIT BOARD ASSEMBLY |
| 41 | SIGNAL CONDITIONER |
| 42 | OSCILLOSCOPE |

FIG. 6B

SIGNAL FROM HORIZONTAL SENSOR(S) 3, 15, 510
WITHOUT THE USE OF SLIDE BEARING 440

SIGNAL FROM HORIZONTAL SENSOR(S) 3, 15, 510
WITH THE USE OF SLIDE BEARING 440

F_friction SIGNAL FROM SENSOR 228
WITHOUT THE USE OF SLIDE BEARING 440

F_friction SIGNAL FROM SENSOR 228
WITH THE USE OF SLIDE BEARING 440

REDUCTION OF ERROR IN TESTING FRICTION AND WEAR WITH THE USE OF HIGH-SPEED RECIPROCATING MOTION

CROSS-REFERENCE TO RELATED APPLICATIONS

This patent application claims priority from the U.S. Provisional Application No. 62/799,767, filed on Feb. 1, 2019. The disclosure of the identified provisional patent application is incorporated herein by reference.

BACKGROUND OF THE INVENTION

Field of the Invention

The invention relates in general to the field of tribology.

Related Art

The field of tribology involves the study of friction and wear on materials. Such study is typically conducted by bringing together (in contact with one another) two or more objects (made of materials of interest), initiating a relative motion between the two objects is started, and measuring the resulting friction is measured. Over time a "wear" track may be created or formed on at least one of the objects as a result of damage caused by the two objects' materials rubbing against each other. There are many different configurations of mechanical testers used for the purposes of such study, each performing a specific dedicated test. The implementation of the present invention addresses a unique piece of equipment that allows the user to perform measurements of friction and wear in materials and lubricants by subjecting these materials and lubricants to a high-frequency reciprocating motion.

Typically, the equipment used for measuring friction and wear is dedicated to a particular test type or test configuration. Examples of this include, without limitation, the configurations referred to in the art as block-on-ring, pin/ball/disk-on-disk, and reciprocating pin/ball on flat. The first type represents a test configuration having or defining a horizontal rotary axis (axis of rotation). Here, a ring-shaped specimen (referred to as a ring, for simplicity of illustration) is connected to a horizontally located drive shaft, a block of another specimen (material) is pushed radially with a known force against the edge of the ring, and the friction force or torque formed between the ring and a block is measured. Thereafter, a coefficient of friction can be calculated from the known load (the normal force) and the measured frictional load.

Similarly, for the ball-on-disk, pin-on-disk or disk-on-disk test configurations, a disk of a given material is mounted to a rotating shift that is vertically oriented. A ball or pin of a second material is then brought into contact with the spinning face of this disk on or at a certain radius. A measured normal force is then applied, and the frictional force between the ball or pin and the spinning disk is measured. Alternatively, the face of a fixed disk can be brought into contact with the face of the spinning disk. In this configuration the two disks are axially aligned.

The third type of test is a reciprocating-type test. In this configuration, an eccentric crank arm is used to transfer a rotary motion on a vertical axis to a reciprocating motion in a plane normal to the vertical rotary axis. In this case, the reciprocating motion follows a velocity profile that is substantially sinusoidal. A test specimen (flat) is mounted on the reciprocating plane and again a ball or pin is brought into contact with a known normal force. The resulting frictional force is measured and the coefficient can be measured.

While traditionally these tests were all carried out on dedicated test machines, co-owned U.S. Pat. No. 6,418,776 disclosed a universal tester in which alternative modules containing a motor and drive were available for use in different test configurations. As discussed, a replaceable module plate (that included a self-contained drive means with a motor was attached to the base. This universal tester was further improved, as described in co-owned U.S. Pat. No. 9,752,969, as an instrument capable of performing measurements in all above-described configurations with a single rotary drive and optional software that was configured automatically for the test at hand. The disclosure of each of U.S. Pat. Nos. 6,418,776 and 9,752,969 is incorporated herein by reference. The current invention relates to a non-obvious combination of auxiliary structural elements configured to improve the instrument further and enable the friction and wear measurement of materials and lubricants at very various speeds of relative movement of the materials with respect to one another (and, in one specific case—at high-speed relative reciprocating movement).

SUMMARY

Embodiments of the invention provide an apparatus for measurement of wear and friction characteristics of a material sample. Such apparatus includes a sample holder (having a first end and a second end, the second end dimensioned to hold the material sample); a bushing dimensioned to accommodate the sample holder therein to permit reversible repositioning of the sample holder along a first axis of the bushing; a horizontal force sensor connected to the bushing; a vertical force sensor operably connected to the sample holder at a first end thereof. In substantially any implementation, the horizontal force sensor may include a piezoelectric element. The apparatus additionally includes a rod pusher configured to contact the first end in operation of the apparatus; and an apparatus sub-system configured to at least reduce an amplitude of a tilting motion of the sample holder with respect to the first axis caused when a relative motion is present between the sample and an auxiliary body brought in contact with the sample. Such apparatus-subsystem includes at least one of a) a linear vertical bearing disposed in the bushing and separating the sample holder from the bushing and b) a horizontally-sliding element disposed between the rod pusher and the vertical force sensor. Alternatively or in addition, the apparatus may include an electrical motor configured to generate a rotational motion and a cam configured to transform such rotational motion onto the relative motion between the sample and the auxiliary body. (In one case, the cam is configured to transform such rotational motion into at least one of (i) a linear reciprocating motion along a second axis that is substantially transverse to the first axis and (ii) a motion along a curve in a plane substantially transverse to the first axis.) In substantially any implementation, the apparatus may include sensors configured to measure a temperature of at least one of the sample and the auxiliary body.

Embodiments of the invention additionally provide the method for conducting a measurement of wear and friction characteristics of a material sample with the above-mentioned apparatus that includes the sample holder, the bushing dimensioned to accommodate the sample holder therein, the horizontal force sensor connected to the bushing, and the vertical force sensor connected to the sample holder at a first end of the sample holder. Such method includes the steps of establishing contact between the material sample held in the sample holder at a second end of the sample holder and an auxiliary body; and carrying out at least one of the following operations: a) applying a vertical force to the first end with a rod pusher of the apparatus to reposition the sample holder vertically with respect to the bushing and with respect to a linear vertical bearing separating the sample holder from the bushing; and b) transferring the vertical force to the vertical force sensor through a horizontally-sliding element positioned between the rod pusher and the vertical force sensor, to at least reduce an amplitude of a tilting motion of the sample holder with respect to a first axis of the bushing caused when a relative motion between the sample and the auxiliary body is present. In any embodiment the method may include generating the relative motion in a plane substantially transverse to the first axis along which the act of applying the vertical force is carried out. (The above-identified relative motion may be one of a linear reciprocating motion along a second axis that is substantially transverse to the first axis and a motion along a curve in the plane transverse to the first axis of the bushing.) In at least one implementation, the act of applying the vertical force to the first end of the sample holder includes applying the vertical force to the sample holder that, in absence of the vertical force, is slidably retained in the linear vertical bearing in a fixed position. Alternatively or in addition, the method may include at least one of: a) causing repositioning of the horizontally-sliding element in the plane substantially transverse to the first axis (along which the applying the vertical force is carried out) as a result of generating the relative motion; and b) causing such repositioning while measuring a temperature of at least one of the sample and the auxiliary body. Alternatively or in addition, the apparatus may include first and second horizontally-sliding elements positioned between the rod pusher and the vertical force sensor, while the method additionally includes the steps of causing repositioning of at least one of first and second horizontally-sliding elements in the plane substantially transverse to the first axis along which the act of applying the vertical force is carried out.

Alternatively or in addition, embodiments of the invention provide (in an apparatus for testing wear and friction characteristics of a material, wherein the apparatus includes a sample holder, a clamp for engagement of the sample holder, a horizontal force sensor connected to the clamp, and a vertical force sensor connected to the sample holder) the improvement that comprises at least one of a vertical linear bearing between the sample holder and the clamp and a horizontally-sliding element between the vertical force sensor and the sample holder. In substantially any implementation, such horizontal force sensor may include a piezoelectric element.

BRIEF DESCRIPTION OF THE DRAWINGS

The invention is now described in reference to the Drawings, of which:

FIG. 3 provides illustration of the structural elements causing errors in operation of the conventionally-configured tester.

FIG. 4 illustrates an embodiment of the chosen portion of the tester configured according to the idea of the invention.

FIG. 6B is a table containing description of components shown in FIG. 6A.

Generally, for simplicity of illustrations, Figures are not to scale and not all components and elements illustrated in one Figure are necessarily present in another.

DESCRIPTION OF THE INVENTION

The invention relates to the new sub-systems and/or components particularly adapted (and judiciously dimensioned) for coupling with the universal tester described in U.S. Pat. No. 9,752,969, a device sold by Bruker Nano Inc. as UMT-TriboLab tester, to enable the measurement of wear and friction of materials and lubricants during a motions (and, in particular—during the reciprocating motion) at very high speeds, as well as the modified tester and the methodology of operating the same.

Figure 1B:
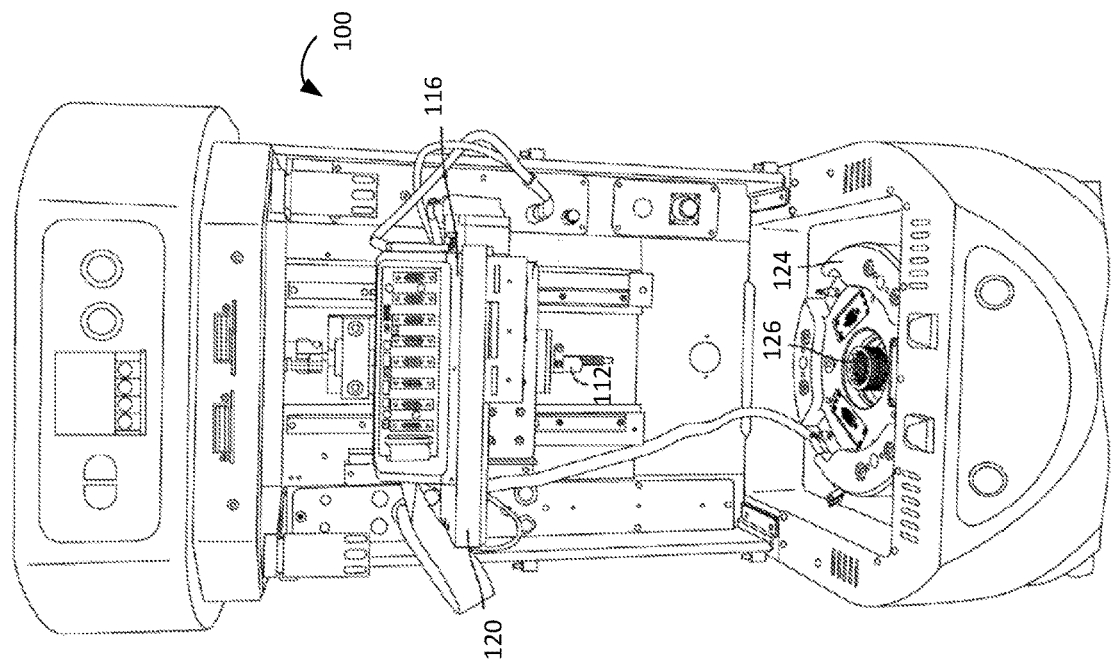
FIGS. 1A and 1B are schematic representations, in different views, of a UMT-TriboLab tester friction measurement system.
Figure 1A:
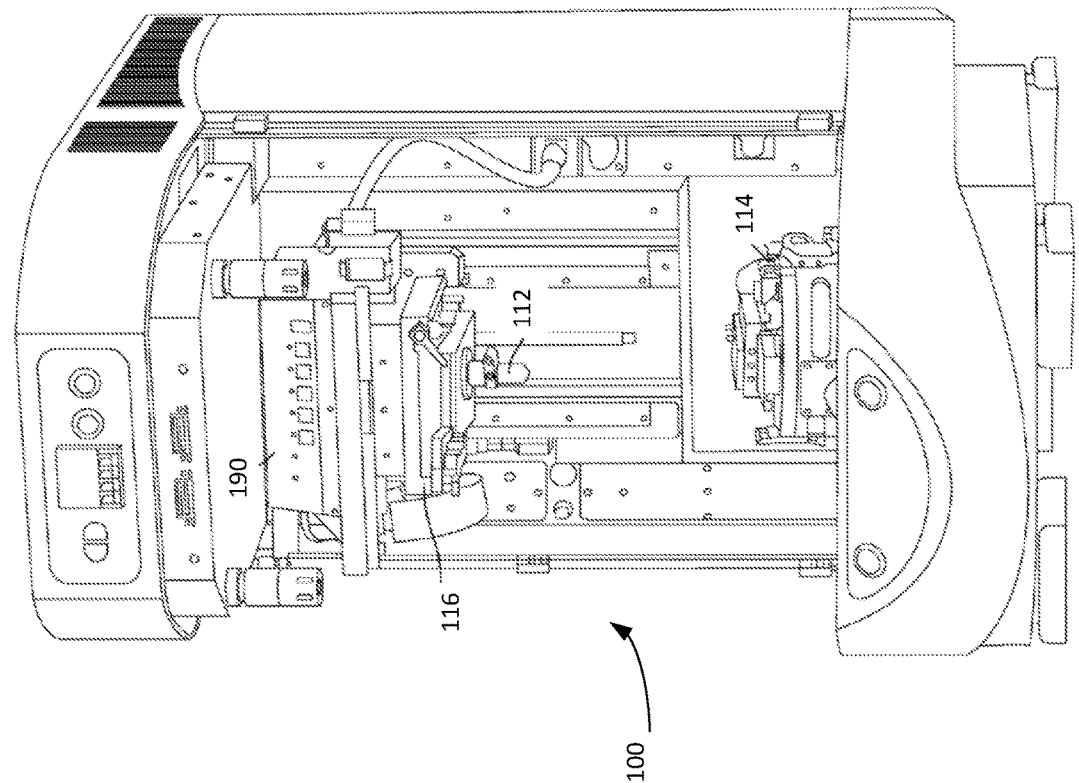

Referring to the Figures, wherein like parts are designated with like numerals and symbols, FIG. 1A, 1B illustrate schematically in different views a UMT-TriboLab tester 100, disclosed in U.S. Pat. No. 9,752,969. Here, the transparent cover that is used to enclose the test area for protection and environmental isolation of the specimens during testing (such as required for temperature and humidity control, for example), to illustrate the relatively large test space allowed by a modular sample stage 114 modified according to the invention.

The modular sample stage 114 is provided for engagement within the base 124 of the tester 100. A single motor (not shown) housed in the frame of the tester is used to actuate the motion of each sample stage (for reciprocation, vertical rotation, or horizontal rotation) though a drivetrain that typically includes a vertical shaft protruding upward with a coupling mechanism 126 from the center of the base 124 of the tester. Such coupling mechanism is preferably a bellows-type coupling to ensure the smooth engagement of the dedicated drive shaft (not shown) protruding from the underside of the stage 114. (The terms vertical, horizontal, and other terms conventionally denoting orientation or directionality, are defined as commonly understood—that is, in reference to the local system of coordinates and the specified piece of equipment positioned in reference to such system of coordinates. For example, the term vertical is understood as referring to being or formed in a position or direction perpendicular to the plane of the horizon, upright or plumb, while the term horizontal refers to one that is at right angles to the vertical, parallel to level ground.)

FIG. 1B illustrates the tester 100 with the sample stage 114 removed from it. The vertically translatable carriage 116, the bidirectional force sensor assembly 120, and the various related actuating mechanisms are conventional and therefore not described in detail herein. The upper sample holder 112 (a chuck or equivalent device) for engaging the upper specimen or body (pin ball, block or disk, not shown) is similarly conventional, such as described in U.S. Pat. No. 6,418,776. Various sub-systems and components of the tester 100 (including, without limitation, the modular sample stages adapted for reciprocating-movement-based measurements, the support base for coupling of a given modular sample stage to the drivetrain contained in the frame of the instrument, the system of sensors and related portions of programmable computer-processor-incorporating equipment for measuring the temperature of the samples and the humidity in the environment containing the samples as well as voltage and acoustic-emission measurements) are described in detail in U.S. Pat. No. 9,752,969.

Figure 2:
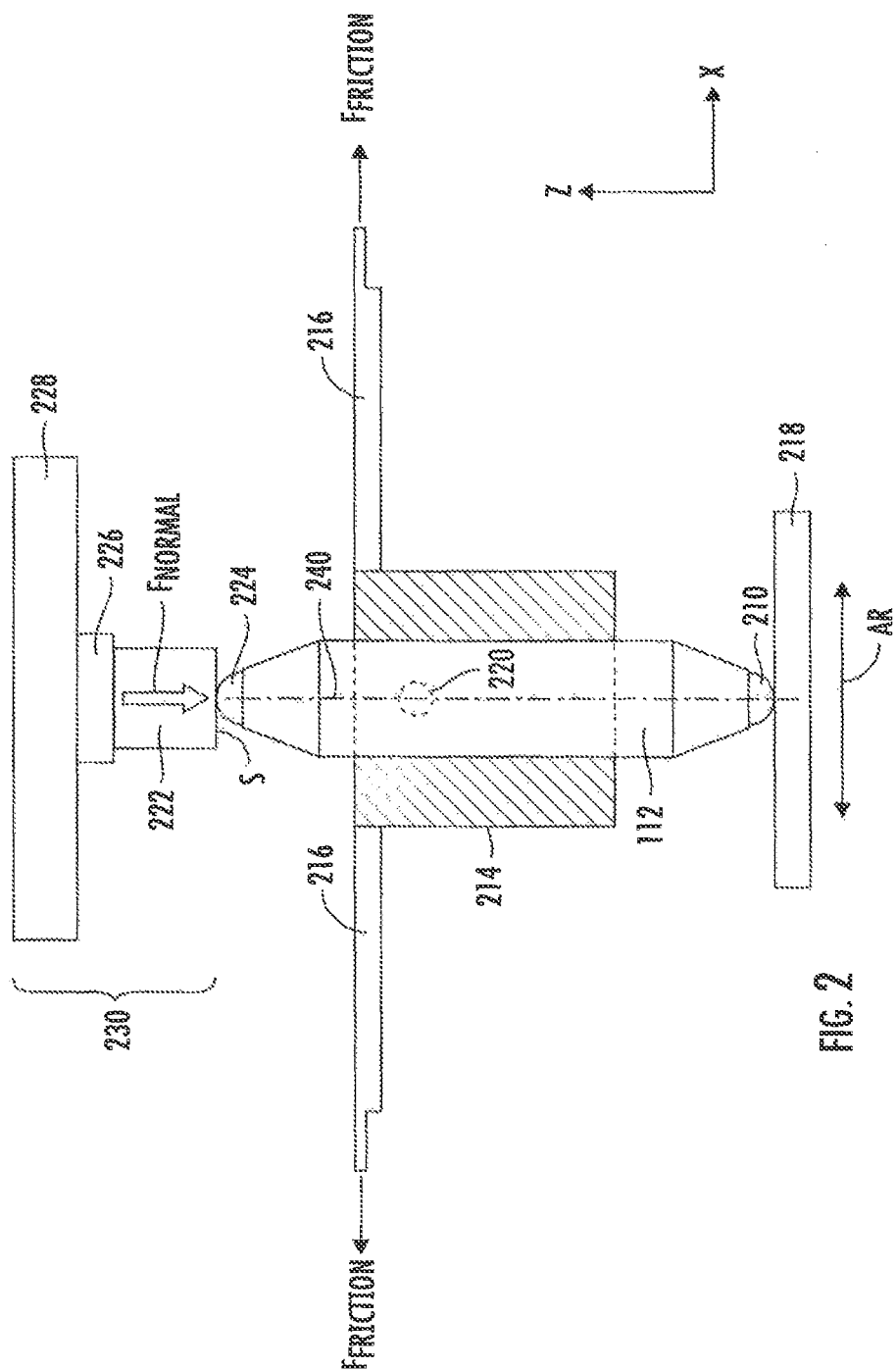
FIG. 2 is a schematic illustration of a chosen portion of the conventional tester, including a sample holder, a normal force sensor, a pusher, and bodies participating in the friction measurement.
Figure 5A:
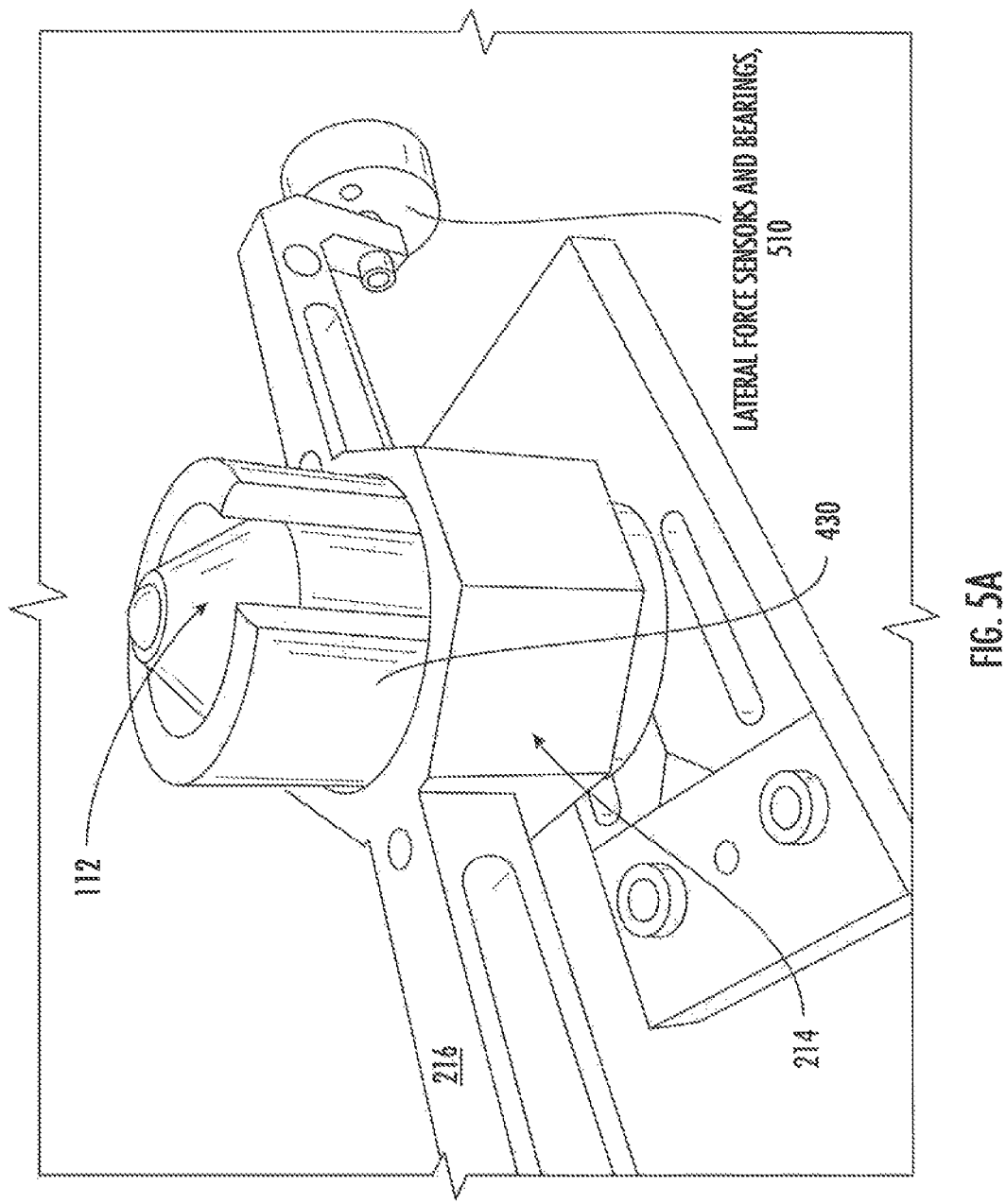
FIGS. 5A, 5B provide different views of the chosen portion of FIG. 4.
Figure 5B:
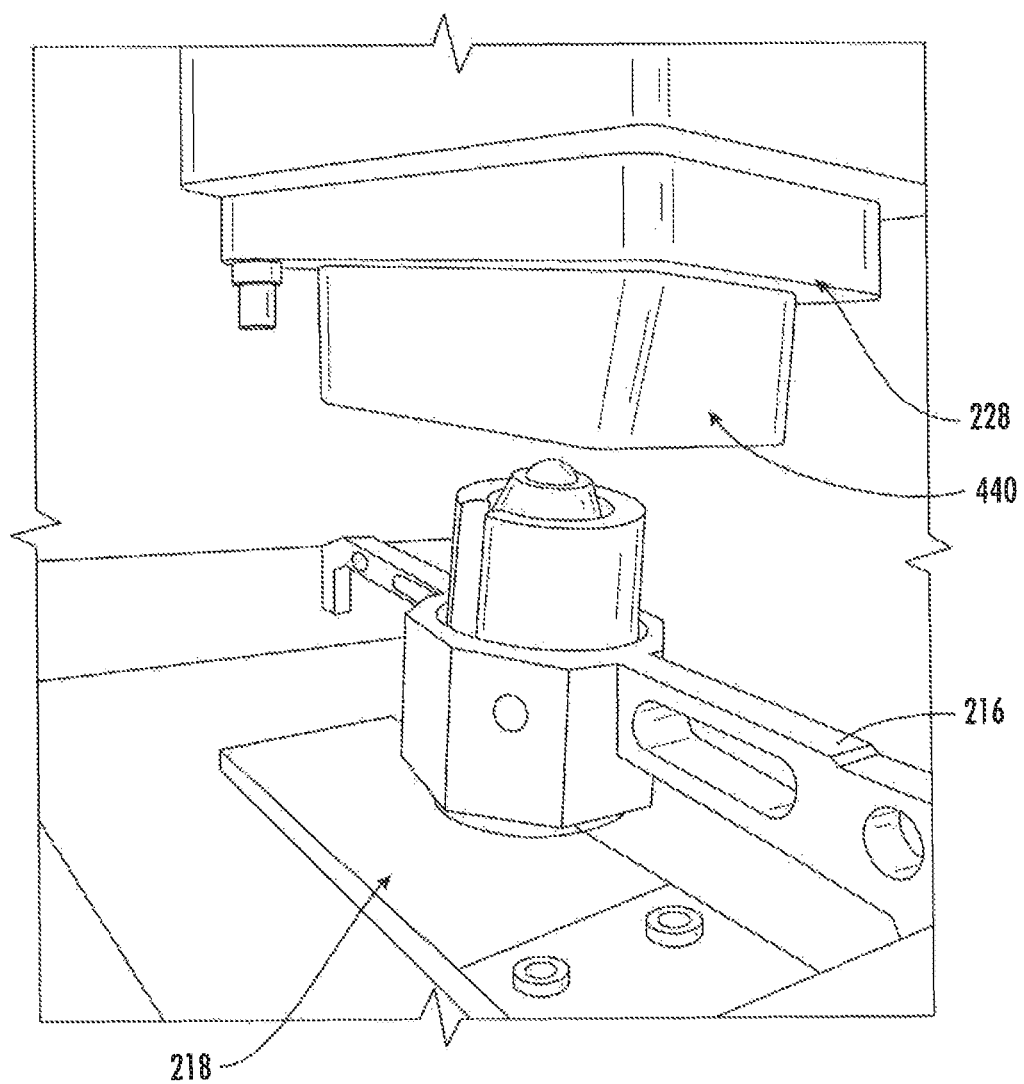

As illustrated schematically in FIG. 2, the apparatus used to perform the test according to the teachings of the U.S. Pat. No. 9,752,969 involves two surfaces (of upper and lower bodies of materials) brought in contact in a conventional manner under conditions where the upper body 210 (typically configured as a sample of interest) that may have a curved surface and may be dimensioned for example as a ball or a cylinder with the axis transverse to the z-axis is attached to a sample holder 112. The latter is affixed in static condition (statically) to a clamp or bushing 214. In a non-limiting example, the sample holder 112 is dimensioned as a cylindrical body (a rod, for example) while the bushing 214 is configured as a cylindrical body (a collar with an appropriately dimensioned cylindrical hollow therethrough, in which the sample holder 112 fits with some minimal clearance). The clamp or bushing 214 is supported by multiple (two, as shown) beams 216 (each of which has an extent in a direction transverse to the axis 240 of the bushing 214; in this case—along the x-axis as shown). The beams are appropriately coupled to strain-gauge load cells (not shown). When the lower body 218 (illustrated as a plate or flat and/or having a sufficiently flat upper surface), that has been brought in contact with the upper body 210, is moved or repositioned in the plane of the body 218 (that is, in the xy-plane as shown), the resulting friction force $F_{friction}$ is measured with the use of these strain-gauge load cells, thereby enabling the calculation of friction coefficient with high precision and repeatability. Non-limiting examples of the motion representing the movement or repositioning of the lower body 218 in the xy-plane are provided by, for example, a motion when a chose portion of the lower body is moved along a plane curve, or along a closed plane curve (such as a circular motion in the xy-plane), or a liner motion carried out in a reciprocating manner—for example, along an axis in the xy-plane. This latter case is illustrated with the arrow AR, identifying a reciprocating motion of the body 118 along the x-axis. In practice, such motion can be effectuated at various speeds—depending on the conditions of the friction measurement—for example, at speeds as high as those corresponding to the reciprocating-motion frequency of tens of Hz and more, depending on the driving motor. For example, in case the 5,000 rpm motor is used to drive the body 118, the reciprocating motion of the body may be about 83 Hz).

In this configuration, the sample holder 112 is affixed inside the bushing 214 with the use of a fixture element—such as, for example, a screw 220. The conventional set up for the UMT-TriboLab tester includes a rod holder 226 and a normal force sensor 228 configured to control and measure the normal force $F_{normal}$ applied to the sample. In operation of the friction tester, the sample holder 112 has to be pushed along the z-axis towards the body 218 with the normal force $F_{normal}$, produced by the conventionally-used upper rod pusher 222 at the point of contact of the pusher 222 with the typically spatially-curved component 224 (such as a ball of material) affixed at the upper end of the sample holder 112, to transfer the force to the surface of the body 218 via the sample holder 112 and the body 210. (The combination of the rod pusher 222, the rod holder 226, and the force sensor 228 is labelled as 230.) To effectuate the transfer of this force, the sample holder 112 must be enabled to appropriately move along the axis 240 (that is parallel to the z-axis of FIG. 2) inside the bushing 214 (which substantially spatially fixed with the use of the beams 216).

The practical deficiency and operational problem presented by the test configuration of FIG. 2 manifest in that the presumably static affixation of the holder 112 in the clamp 214 (with the use of, for example, a clamping screw 220) substantially prevents any operationally-required movement of the sample holder 112 along the axis 140 As a result of such prevention, the transfer of the normal force $F_{normal}$ towards the bodies 210, 218 $f$ is detrimentally affected, which in turn causes the results of the measurement to not correctly reflect the actually-occurring normal force. In devising this set-up of related art, it was assumed that the flexibility of the beams 216 would provide sufficient give to transmit unaltered the vertical force applied by the rod pusher 222, but in fact that assumption proved to not be the case when relatively small load forces were involved.

Another problem with operation of the system of FIG. 2 lies in the fact that the sample holder 112 cannot, actually, be clamped inside the bushing 214 in a completely static manner. As illustrated with some more detail in FIG. 3, and as a skilled artisan will readily appreciate, because of the interstitial space or clearance between the outer surface of the finger 112 and the inner surface of the bushing 114 (marked as "I"), which is necessarily present between the inner surface of the bushing 214 and the outer surface of the holder 112 in order to allow the assembly of the device and the need to transfer the force by moving the sample holder 112 along the z-axis in response to $F_{normal}$, the frictional force produced by the reciprocation motion AR of the lower body 218 causes the holder 212 to swing around the clamping screw 220 (or other retaining means used to couple the holder 112 to the bushing 214) and produce rocking motions of the upper and lower portions of the sample holder 212 in the fashion illustrated schematically by arrows AF (and attendant friction effects cause by such motions(s)). It is understood that the rocking motion AF of the sample holder is associated with and accompanied with the tilt of the sample holder with respect to the axis 240.

Here, the motion AF of the upper portion of the sample holder 112 (which is illustrated as a displacement between the element 224 and the flat surface S of the rod pusher 222, conventionally used to exert the vertical force required to measure friction at the sample) forms and produces parasitic frictional forces at the point of contact between the element 224 and the rod pusher 222. These parasitic forces modify the length of the stroke(s) of the motion between the bodies 210, 218 (that is, cause inaccuracy of the stroke length): as a person of skill in the art understands, when setting up the measurement experiment, the cam is adjusted to produce a certain stroke length or amplitude of the motion between the bodies at hand. Ideally the "wear scar" from the reciprocating motion should be reflective of that. If there is rocking motion of the sample holder 112 present, however, the wear scar will be reduced by the rocking motion. Furthermore, the same parasitic forces introduce a yet additional error in the measurement of the normal force $F_{normal}$ applied to the sample.

The idea of the present invention stems from the realization that minimization or even elimination of the rocking motion AF of the sample holder 112 during the relative motion between the brought-in-contact with one another bodies 210, 218 substantially eliminates the error of the friction measurements that is inevitably present in the results delivered by a tester of related art. Implementation of the invention manifests in a unique combination of components of novel design, such as bearings and force sensors that make it possible to carry out reliable measurements under such experimental conditions.

The invention involves the design, implementation, and operation of a new clamping device that, when attached to the otherwise conventional UMT-TriboLab tester (shown in FIGS. 1A, 1B), allows the improved-accuracy and repeatability measurement of friction produced by a chosen motion of the body 218 at well-controlled speeds. (In one example, the measurement of friction between the bodies 210, 218 in the range of the relative reciprocating motion at frequencies from about 0.01 Hz to about 100 Hz or to about 500 Hz. The implementation of tester device according to the idea of the invention (where such device may be made of steel or/and high-temperature-resistant metal alloys) generally includes a lower device module or sub-portion adapted for various forms of relative, between the bodies 210, 218) motion, such as, for example, the reciprocating motion of the body 218 by the action of an electric motor; and an upper device module (which houses the sample under test) that is static and is mechanically coupled to the force sensors that monitor/measure the friction forces arising from the friction created by the motion of the lower device module in contact with the sample held in the upper device module. In addition, an external carriage is provided to be used in conventional manner to apply a predetermined vertical force between the modules to create the friction required to test the sample.

FIG. 4 schematically illustrates one embodiment 400 of a portion of the device of the invention. As shown, the upper device module 410 of the embodiment 400 includes the sample holder 112 dimensioned to be attached to the clamp or bushing 214 and accommodate the sample 210 to be tested. The sample 210 can be dimensioned as a ball (as shown), or could be a pin, a cylinder, a flat surface, or any other part of specific size and shape (for example, an engine piston ring). The upper module 410 also includes the horizontal beams 216 connected to the horizontal force sensor(s) (not shown) that operate by measuring the friction produced by the motion of the lower body 218 along the axis represented by the arrow AR.

The problem of minimization or even elimination of the rocking and/or precession-like motion AF of the sample holder 112, specific to operation of the devices of related art, is solved by introducing, into the upper device module 410, a linear vertical bearing element 430 disposed in the hollow of the bushing 214 and structured as a sleeve between the sample holder 112 and the bushing 214. Such bearing is dimensioned to allow the vertical motion of the sample holder 112 within the bearing 430 during the application of the force $F_{normal}$ to the upper end of the sample holder 112, thereby substantially reducing or eliminating the error produced in related-art devices in the measurement of the true normal force applied by the rod pusher 222 at the point of contact between the sample 210 and the spatially-repositioning lower body 218.

Notably, while a retaining screw 220 may still be used to facilitate the retaining of the sample holder 112 in in the bearing 430, in one implementation the bearing 430 is judiciously dimensioned to ensure the vertical (along the z-axis) repositioning of the sample holder 112 with respect to the bushing 214 and the bearing 430 when the normal force $F_{normal}$ is applied to the sample holder while, at the same time, preventing the sample holder 112 from repositioning with respect to the bushing 214 and/or bearing 430 when such normal force is absent. In such embodiment, there are no means (such as a retaining screw, for example) configured to prevent a slidable repositioning of the sample holder with respect to the linear vertical bearing in absence of the normal force applied to the sample holder. Alternatively or in addition, the retaining screw 220 may be used to affix the linear vertical bearing 430 in the hollow of the bushing 214.

Alternatively or in addition—and according to a related implementation of the invention, the upper module 410 may be complemented with a linear bearing structure 440 between the rod holder 226 and the force sensor 228. In one implementation, such bearing structure 440 may be configured as a low-friction slider table, translatable in a direction transverse to the z-axis along which the normal force $F_{normal}$ is applied to the sample, to permit a smooth relative horizontal (along the axis represented by the arrow AR) motion between the parts when friction/lateral forces are applied by any residual rocking motion of the sample holder 112. A skilled person will readily appreciate that the result is a more precise measurement of the horizontal frictional forces produced at the contact point with the sample 210.

The external carriage applies the load required for the test by pressing the sample holder, with the sample, against the moving part coupled to the lower module. Thus, as modified according to the idea of the invention, the external carriage of the tester includes the horizontal sliding-element bearing structure 440 (such as a linear bearing) installed between the rod holder 226 and the vertical/normal force sensor 228 to effectuate the decoupling of the upper module 440 of the device 400 from the beam that transfers the lateral forces.

The lower module 450 of the embodiment of the device shown in FIG. 4 also includes a holder (not shown for simplicity of illustration) for the moving part 218 that engages the sample 210 (which can be a flat surface as illustrated, or also a surface with a curvature, or any other component appropriate for the test such as a section of an engine cylinder liner for testing a piston ring). The holder in the lower module 450 is, in turn, attached to an auxiliary mechanism(s) shown schematically as 460 described in U.S. Pat. No. 9,752,969, that convert(s) the circular/rotational motion produced by an electric motor into the desired type (for example, translational along the closed curve or reciprocating) of motion of the body 218 by using a cam.

FIGS. 5A, 5B, 7A, 7B provide different views of a portion of the conventional tested structurally-modified according to the above-presented ideas of the invention. Here, the linear cylindrically-shaped bearing 430 that is appropriately disposed to enclose the sample holder 112 is used with or without the additional slide bearing element 440. Components associated with the measurement of lateral (friction) force(s) such as lateral force sensors (in one example —piezo-electric element based sensors) and bearings are marked 510.

Figure 6A:
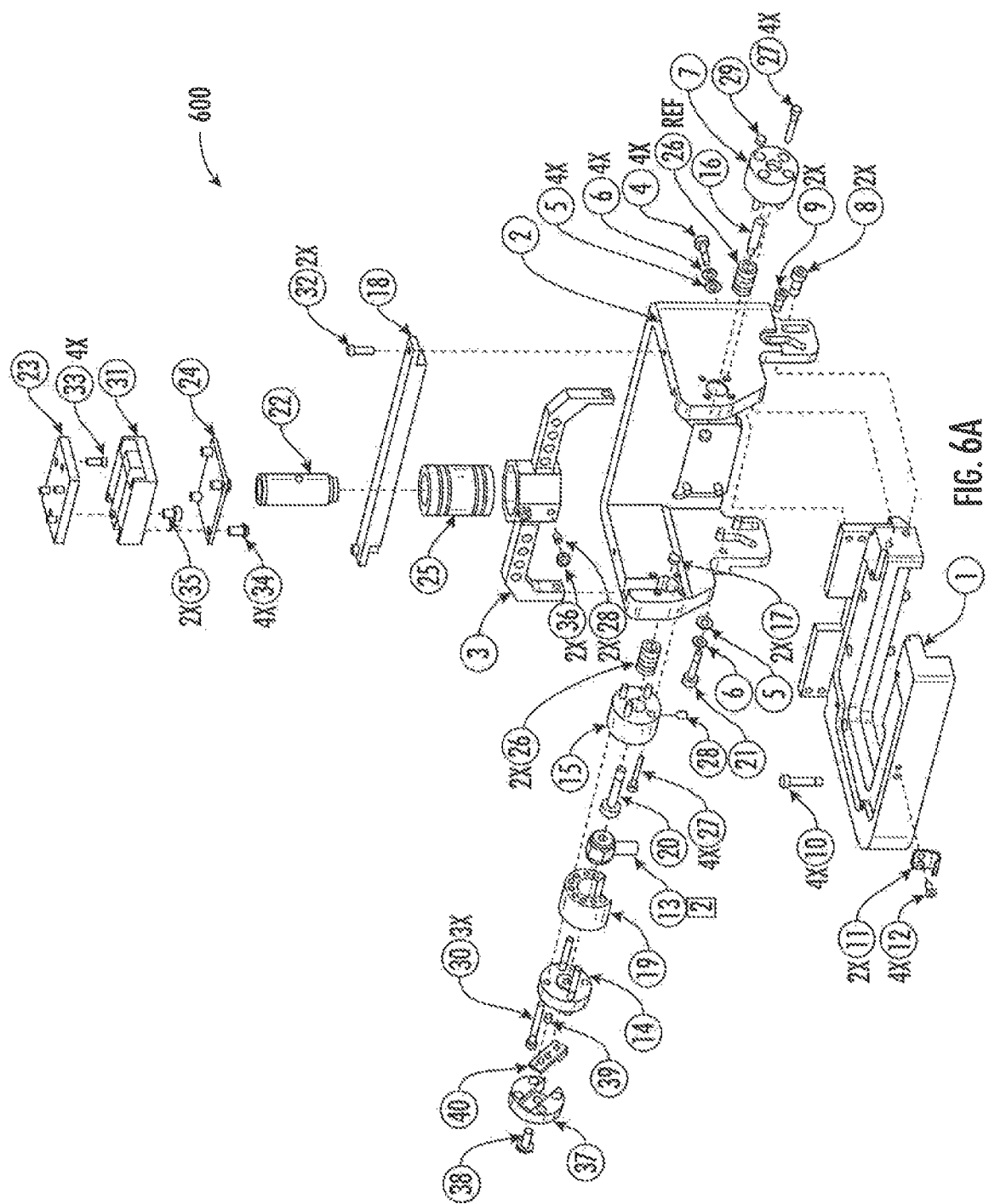
FIG. 6A is an exploded view of a section of the UMT-TriboLab tester modified according to the idea of the invention.
Figure 6C:
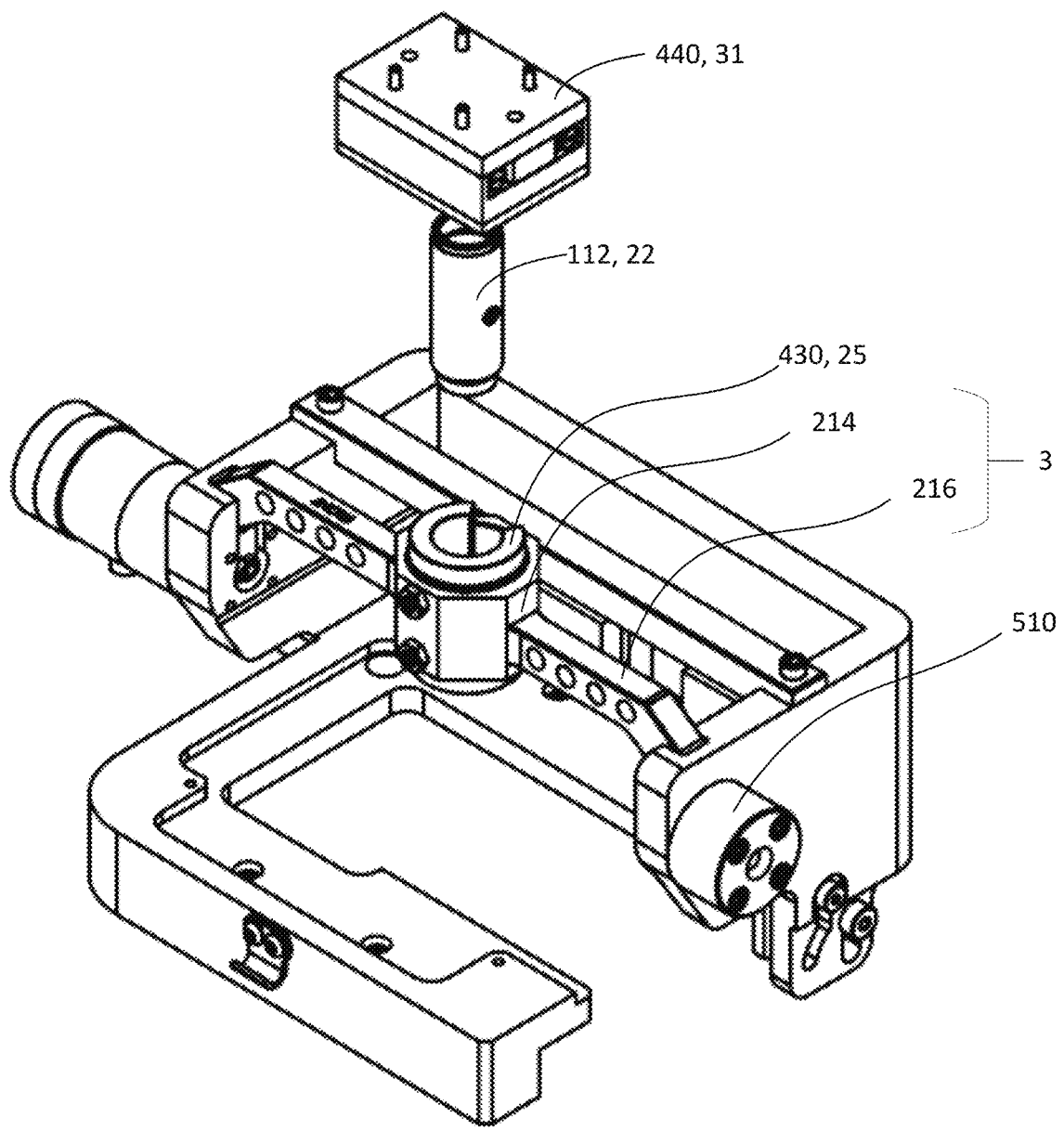
FIG. 6C is a view of the assembled section off the modified tester of FIG. 6A.
Figure 7B:
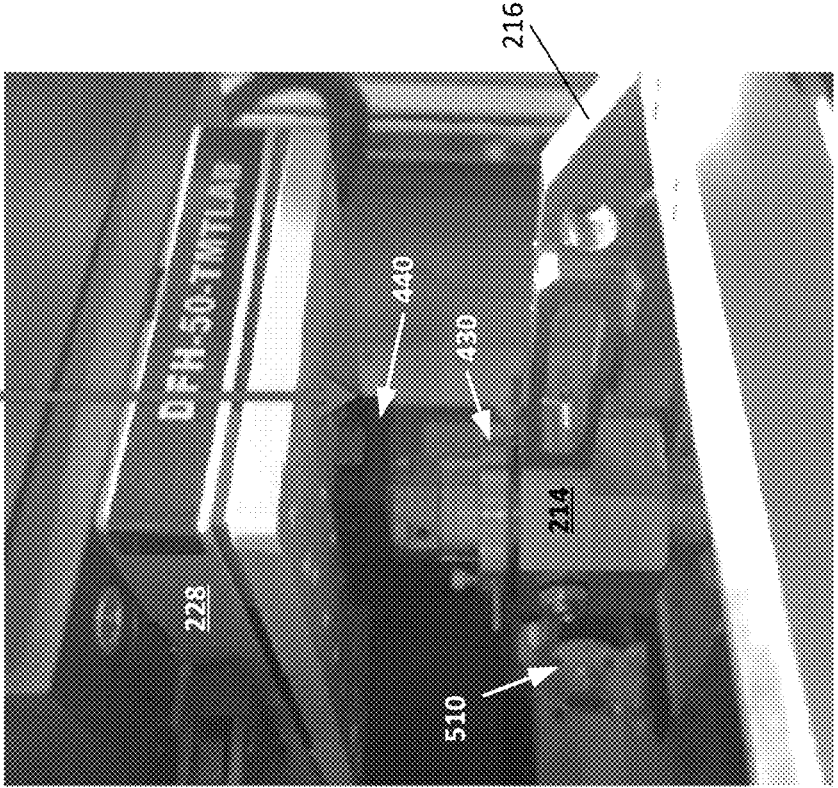
FIGS. 7A, 7B provide additional views of the chosen portion of FIG. 4.
Figure 7A:
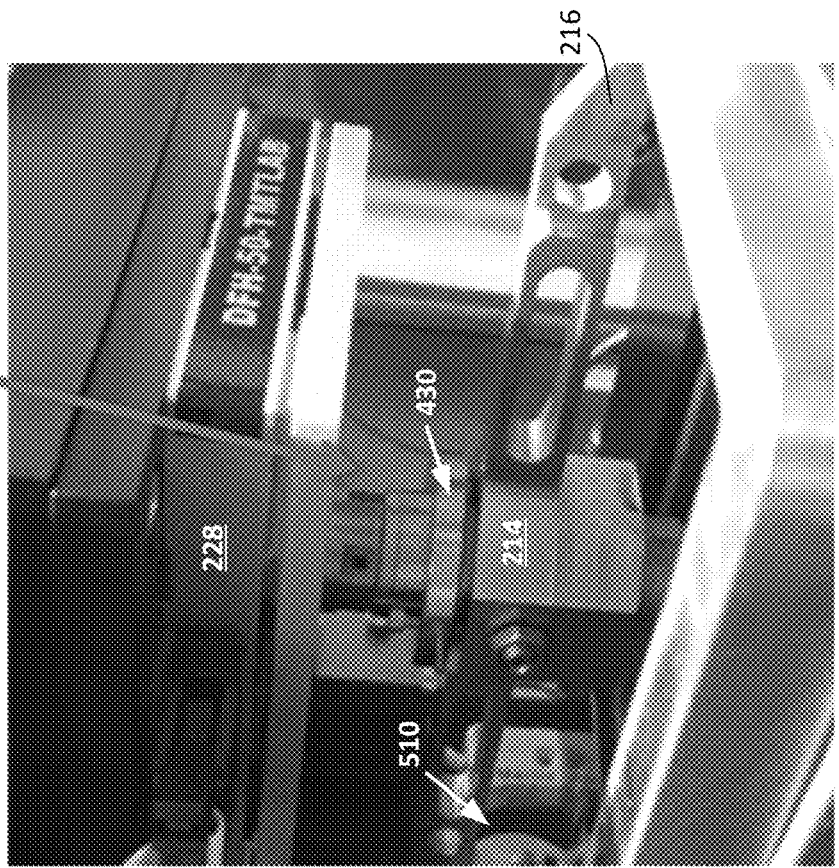

FIG. 6A presents, in an exploded view, one implementation of the structural module 600 containing and supporting the lateral beams 216, bushing 214, linear bearing 430 sample holder 112, and the slide bearing 440 of the embodiment 400, as well as additional structural components of the overall device. As shown in FIG. 6A, the element 3 denotes the beams 216 (with the bushing 214 located in the middle of the element 3 and not labelled in FIG. 6A); the element 25 is used to label the linear bearing 430 fitting into the bushing and separating the sample holder 112 (element 22) from the bushing; while the slide bearing 440 is shown as element 31 and sensors configured to measure the frictional force are enumerated as 7 and 15. The sensor configured to measure the normal force $F_{normal}$, applied to the sample via the sample holder 112, 22, are not shown in this Figure and positioned above the plate labelled as 23. The description of other auxiliary and complementary components shown in FIG. 6A is itemized in the table of FIG. 6B. To complete the description of the module 600, FIG. 6C provides the schematic of the module 600 in a fully assembled form.

Because the implementation of invention has allowed practical measurements of friction at very high reciprocating speeds (such as at those corresponding to the reciprocating motion frequencies up to 100 Hz (and up to about 83 Hz in one non-limiting example), the response of conventional strain-gauge force sensors was found to be insufficient, too slow to keep up with the oscillating relative motion between the bodies 210 and 218. However, it was discovered that that the use of a load sensor based on piezo-electric elements successfully solves this problem. Thus, as a result of the combining the elements described above, the system structured according to the idea(s) of the invention is expected to improve the field of lubricant and material development by enabling the testing of friction and wear of materials and lubricants at high reciprocating speeds heretofore attained in the art only with dedicated machines, rather than with multipurpose testers, as described herein.

As a skilled artisan familiar with the field of related measurements will readily appreciate, the actual experimental measurements of the wear and friction of the two materials—the one of sample 210 and another of the lower body 218 (which will be now addressed for the case of relative reciprocating linear movement of the sample 210 and the body 218 brought in contact with one another) can be performed with the use of various lubricants and/or with different values of $F_{normal}$ applied to the sample 210/body 218 interface along the sample holder 212 and/or with reciprocating strokes of different lengths. Without reiterating the commonly understood conditions of such measurements, and referring now to the plots representing experimental results, it was practically proven that the implementations of the ideas of the present invention caused a significant reduction of the rocking motion characterizing the use of the conventional measurement tester of related art, and allowed for substantial reduction of the corresponding measurement error.

Figure 8A:
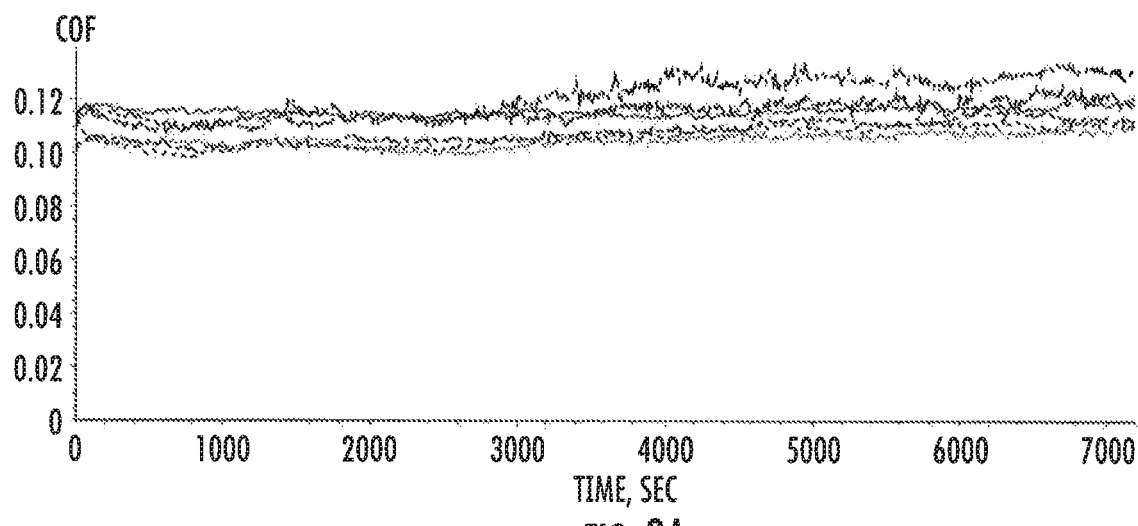
FIGS. 8A, 8B, 9A, 9B, 10A, 10B, 11A, 11B are plots showing results of measurements of experimental parameters, representing friction and wear testing of specified material components, carried out with the conventional tester and with the tester configured according to an embodiment of the invention.
Figure 8B:
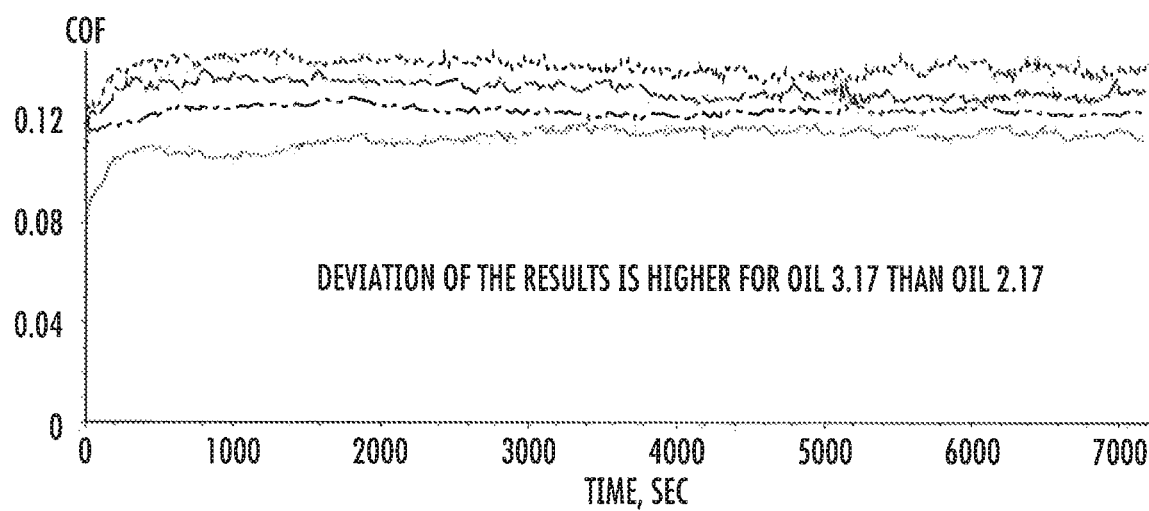
Figure 9A:
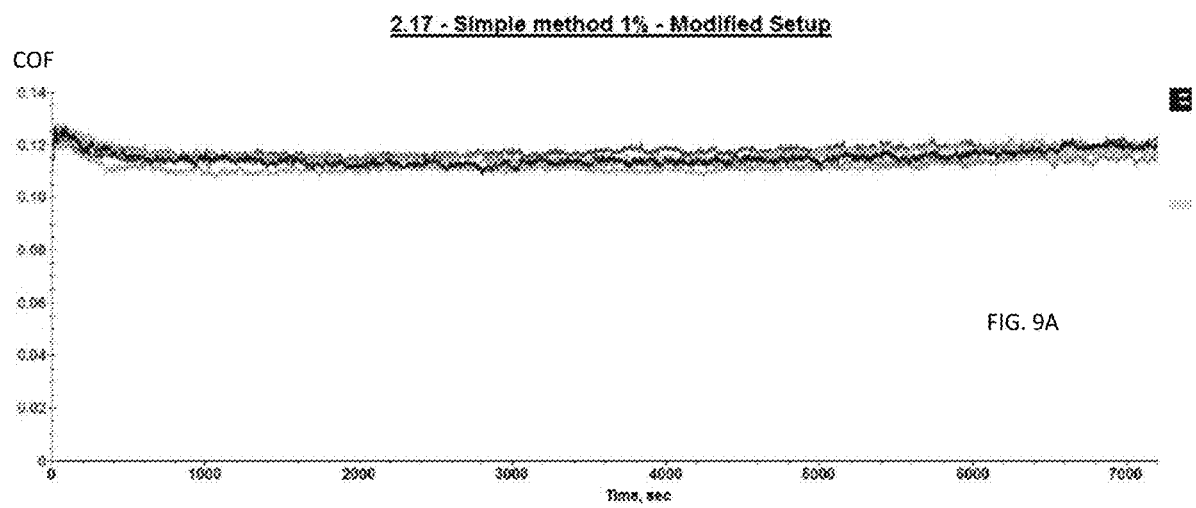
Figure 9B:
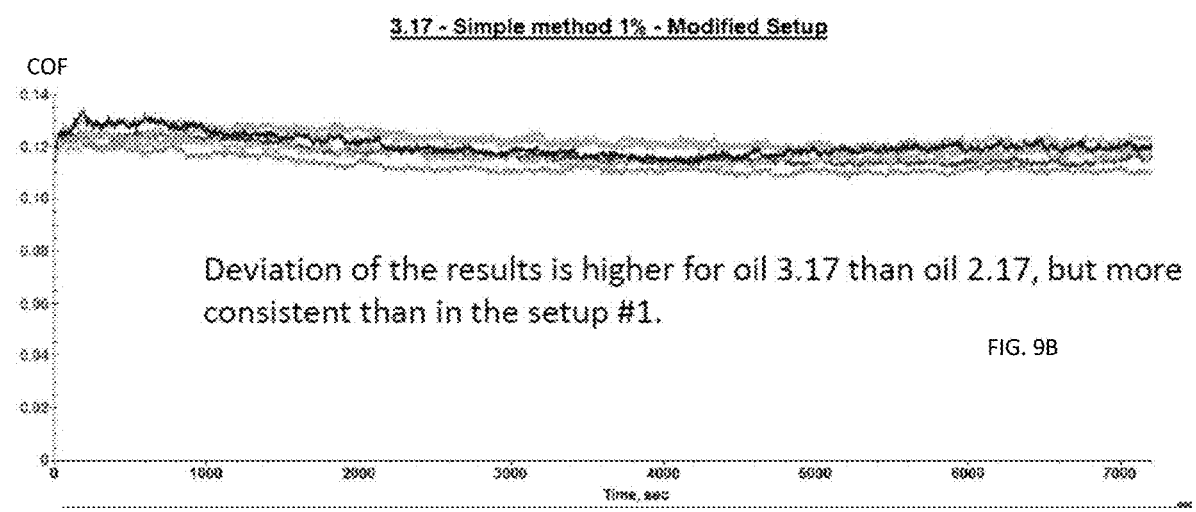

To this end, the illustrations provided by FIGS. 9A, 9B provide the skilled artisan with evidence of highly repeatability of the measurement of the coefficient of friction (COF) performed with the use of the sensors (3, 15, 510) in the UML-TestLab tester that has been re-structured according to the embodiment of FIG. 4—as compared to the results of the tests performed with the use of a conventional setup (seen in FIGS. 8A, 8B). Here, the tested samples included steel disks (body 218) and steel balls (body 210) with the use of oils 3.17 and 2.17 as test lubricants. The tests were performed at reciprocating linear motion frequency of about 50 HZ, with the linear stroke length of about 1 mm, for about 2 hours with the loading force $F_{normal}$ of 300 N in 120 C ambient environment (test conditions of "50 Hz-1 mm-2 hrs-300 N-120 C"). While some difference can be observed in the behavior of the COF during the measurements with the use of different lubricants (and represented by different curve of FIGS. 9A, 9B), the measurements performed while at least one of the bearings 430, 440 were utilized are characterized by a substantially smaller deviation than those performed without the bearings 430, 440. (Indeed, the spread among the curved of FIGS. 9A, 9B is substantially smaller than that of FIGS. 8A, 8B).

A related measurement, in which similar test samples and lubricants were used, and which were conducted under the test conditions of "20 Hz-4 mm-2 hrs-300 N-120 C" and "50 Hz-1 mm-2 hrs-300 N-120 C" with and without the linear slide bearing 440, provided additional proof of the practical improvements caused by implementations of the invention. Here, the use of a horizontal slide bearing 440 provided a substantial separation between the upper and lower parts of the test instrument. The low COF of this bearing (in rolling motion) facilitated the substantially free movement of the beam(s) 216, and highly reduced the signal generated by the horizontal (lateral) component of the force sensor 3, 15, 510. Here (in reference to FIGS. 7A, 7B) a comparison was made of the results of one measurements performed with the use of the bearing 430 but in absence of the bearing 440, and another measurement during which both 430, 440 bearings were employed.

Figure 10A:
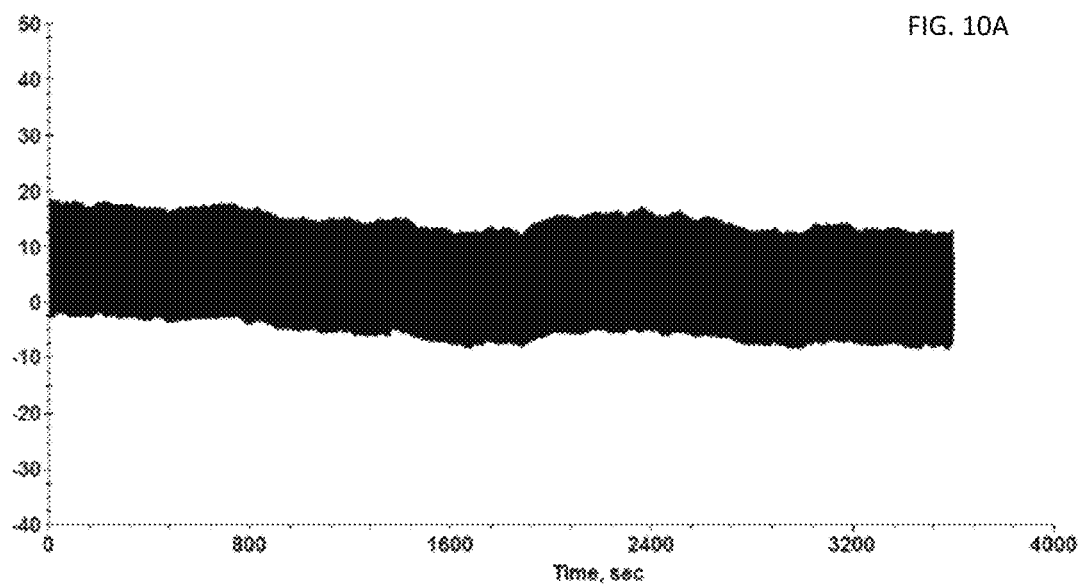
Figure 10B:
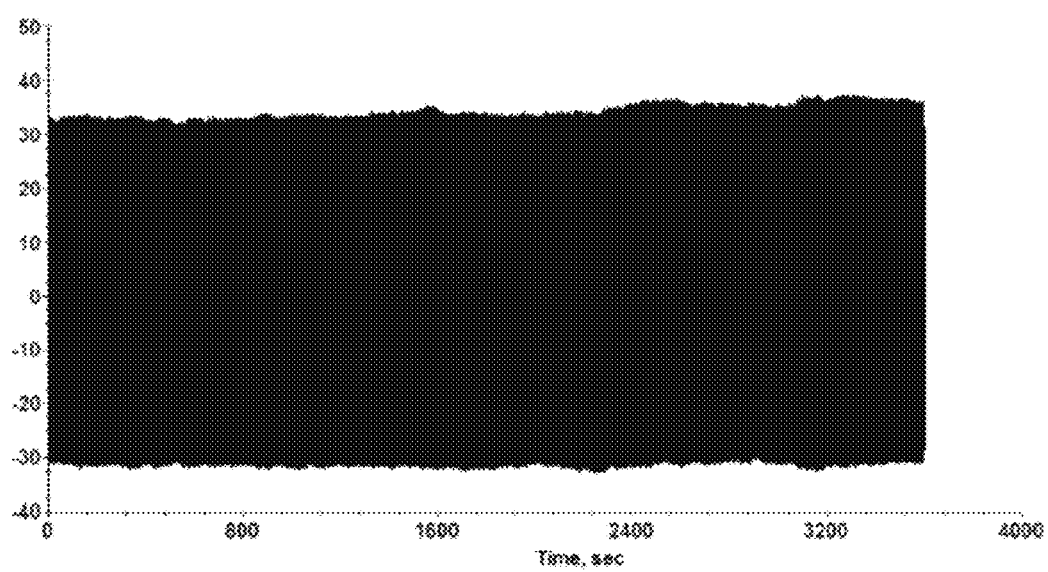
Figure 11A:
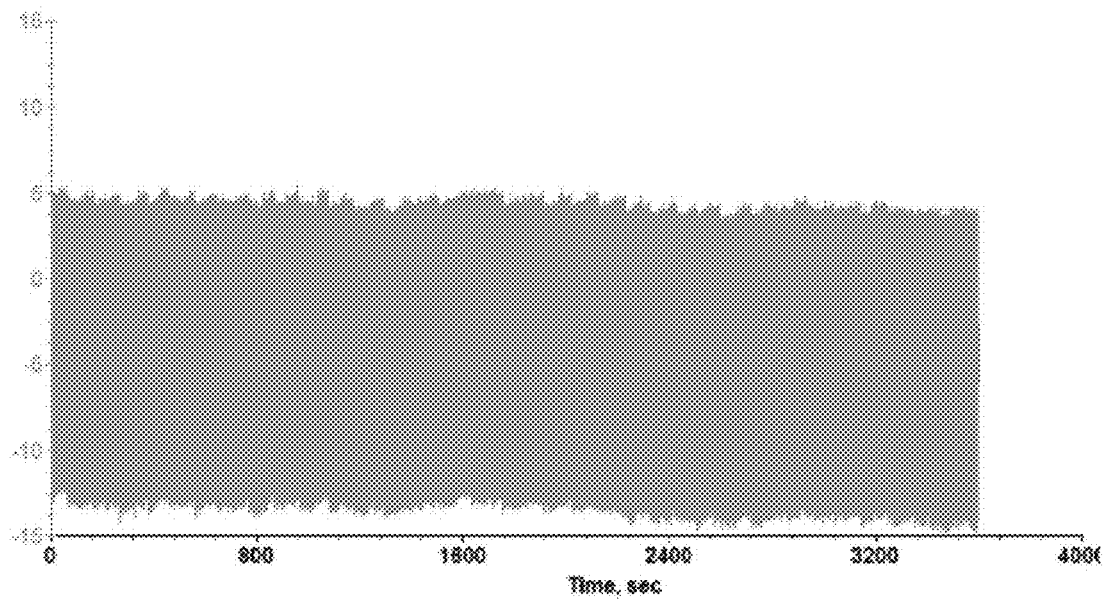
Figure 11B:
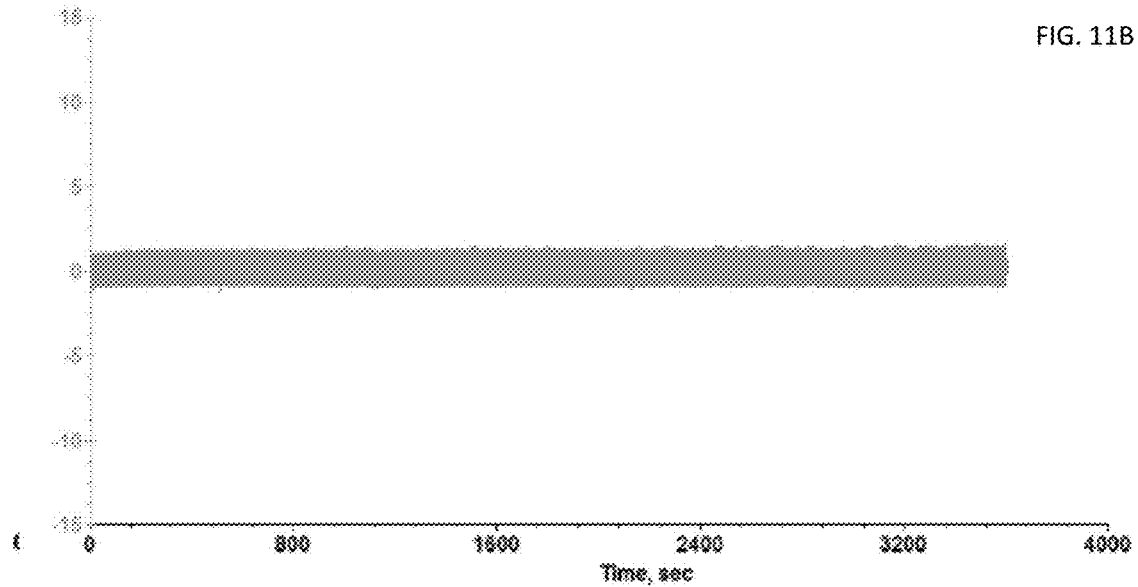

The results are illustrated in FIGS. 10A, 10B, confirming that in a setup that lacks the linear slide bearing 440 most of the applied force is distributed such that it's registered by the DFH sensor (which is the sensor 228 configured to measure both the $F_{normal}$ applied to the sample 210 and the frictional force $F_{friction}$) and not much is registered by the sensor(s) 3, 15, 510). Further, from the comparison between the results presented in FIGS. 11A, 11B is becomes apparent that in the setup in which the slide bearing 440 is present, most of the frictional force is measured by the sensor(s) 3, 15, 510 and only about 1-to-2 N are registered at the sensor 228 (which is the signal caused, mostly, by vibration), which is indication of substantial absence of the (now compensated with the slide bearing 440) rocking motion of the sample holder 112. In the case where the slide bearing 440 is absent, however virtually all the frictional force is being distributed to the sensor 228 (as a result of the rocking motion of the sample holder 112).

A skilled artisan will readily appreciate, therefore, that embodiments of the present invention include a universal apparatus configured to test wear and friction characteristics of a chosen material. Such apparatus includes a frame containing a carriage that is moveable along a vertical plane and a slide moveable along a horizontal plane. The apparatus further contains a force sensor assembly coupled to such slide; a holder for an upper specimen (with the holder being coupled to the force sensor assembly); a first mechanism configured to cause (in operation of the apparatus) this upper specimen to exert a predetermined force on a lower specimen (when both the upper and lower specimen are loaded into the apparatus) and transfer this force via a member holding the upper specimen an passing through a linear bearing separating the member from structural beam(s) connected to the force sensor assembly. The apparatus additionally contains a plurality of modular sample stages, each of the modular sample stages including a support for the lower specimen and a second mechanism for producing a motion of the lower specimen relative to the upper specimen. (Such second mechanism, depending on the particular implementation, may be appropriately configured to cause this motion rotational around a horizontal axis in one of the sample stages, rotational around a vertical axis in another of the sample stages, and/or linearly reciprocating along a horizontal direction in yet another of the sample stages.) The apparatus further includes a base for alternatively supporting one of the sample stages, which base contains a locking mechanism configured to couple at least one of the stages to the base and a rotational drive that is adapted to engage the second mechanism). The apparatus further contains a motor that is housed in the frame and that is adapted to actuate the rotational drive; a controller electronic circuitry configured to vary the force exerted on the sample; a computer processor programmed to execute a predetermined set of test operations; and means for identifying one of the sample stages coupled to the base and for automatically enabling only such a subset of the test operations that corresponds to a chosen one of the stages coupled to the base. The use of the judiciously disposed linear bearing separating the sample holder from the bushing and/or the use of slide bearing de-coupling the upper portion of the instrument from the lower portion of the instrument increases the reproducibility of the measurement result, in part due to allowing the free lateral displacement of the SLB beam (which is now not pivoting, as with the use of the conventional instrument of related art).

As discussed in U.S. Pat. No. 9,752,969, an embodiment of the tester of the invention may include sensors appropriately configured for measuring the temperature of the upper and lower bodies 210, 218 and/or the humidity in the environment containing these bodies. As shown in FIG. 10 of U.S. Pat. No. 9,752,969, and in further reference to the current FIG. 1A, a bank 190 of slots may be provided in the tester for activating respective scripts in software (by inserting expansion cards in respective dedicated slots) that enable test protocols relevant to temperature and/or humidity measurements, as applicable. Dedicated slots are also available for controlling and measuring voltage applied to the samples and for measuring resistance across the samples, as well as for acoustic-emission measurements on the materials under test. Each such card includes electronic circuitry configured to activate a relevant test protocol and is also labeled with an electronic identification that is automatically recognized by the system's software so as to enable only the scripts relevant to the particular card, thereby avoiding erroneous script implementations.

Figure 12:
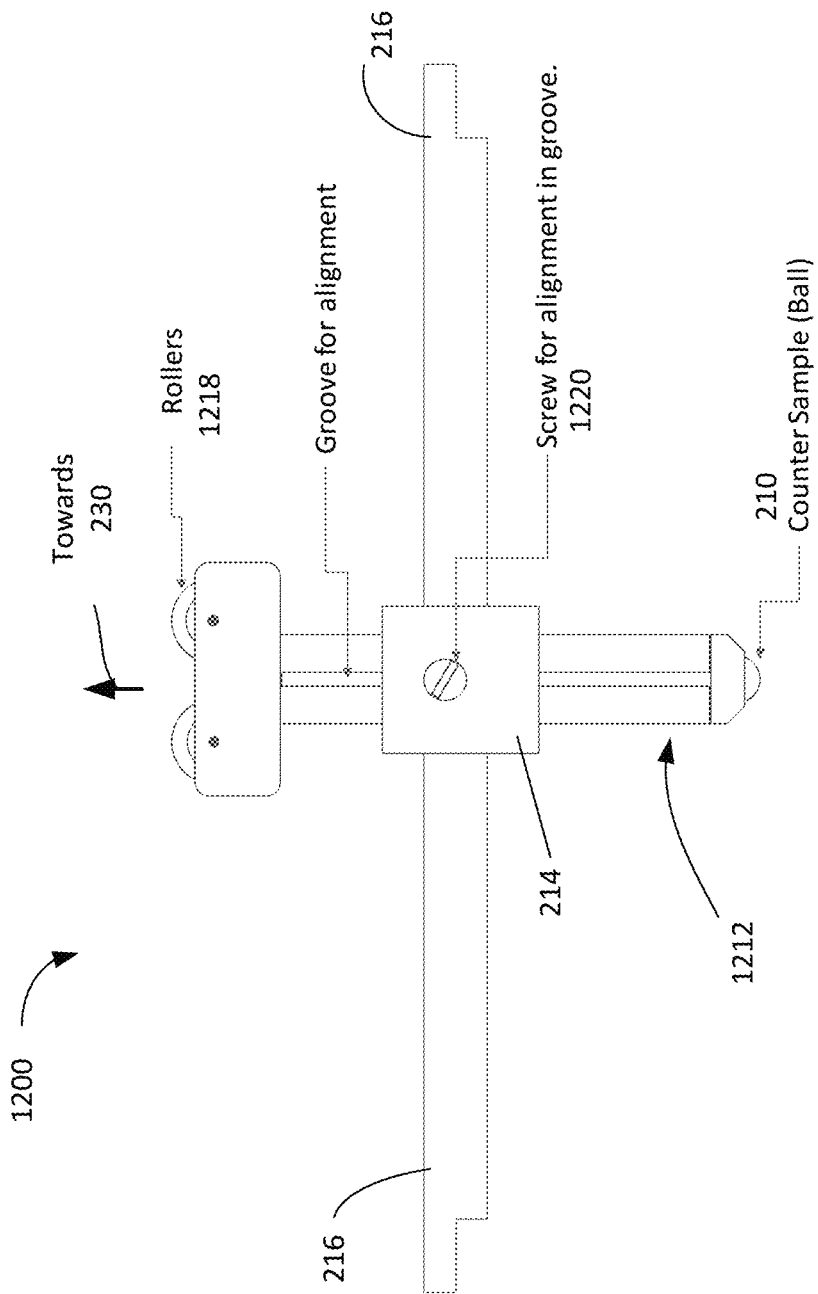
FIG. 12 provides illustration of an alternative related configuration of a portion of the apparatus of the invention.

Various modifications (to the structure of the sample holder 112 and/or the ways in which the sample holder is cooperated with the beams 210) can be used as long as these modifications serve to achieve the same effect of reducing or eliminating the rocking motion AF during the measurements of friction and/or wear of the material. Such modifications remain within the scope of the invention. One possible modification of the relevant portion of the apparatus is schematically shown in FIG. 12. Here, the sample holder 1212 is judiciously structured to have its upper end (facing the rod pusher 222 in the conventional implementation of related art) modified to include means for creating a rolling motion between the sample holder 1212 and the rod pusher 222. As shown, this means includes at least one ball bearing 1218. (The term ball bearing, unless expressly defined otherwise, refers to a bearing between a wheel and a fixed axle, in which the rotating part and the stationary part are separated by a ring of small solid metal balls that reduce friction, and/or to a metal ball used in a ball bearing, and/or to structurally-alternative means configured to perform as a typical ball bearing.

As a result of this modification, the mechanical coupling between the sample holder 1212 and the combination 230 is reduced substantially and in the same fashion as that resulting from the implementation of the slider 440 of the embodiment 400. In one case, the sample holder 1212 may be structured as a single-piece, stand alone elongated member passing through the bushing 214 (with or without the 430 inside the bushing) and optionally incorporating a groove 1220 along the side of the holder. The tip of a set screw 1220 (if used) could go into the groove, not so tight as to clamp the system but sufficiently enough to introduce interference preventing the holder 1212 from rotating and, therefore, rocking as discussed above. In yet a related modification, alternatively or in addition, the force sensor 228 (not shown) can be configured to include a hardened steel plate, for example, to push against the ball bearing(s). Understandably, with the use of the structure 1212 containing ball bearing(s) 1218, the employment of the slider 440 is not required and is, therefore, optional.

References throughout this specification that may have been made to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same implementation of the invention. It is to be understood that no portion of disclosure, taken on its own and in possible connection with a figure, is intended to provide a complete description of all features of the invention.

In addition, it is to be understood that no single drawing is intended to support a complete description of all features of the invention. In other words, a given drawing is generally descriptive of only some, and generally not all, features of the invention. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

While the invention has been shown and described herein with reference to what are believed to be the most practical embodiments, it is recognized that departures can be made within the scope of the invention and, therefore, the invention is not to be limited to the details disclosed herein but is to be accorded the full scope of equivalent articles.

The invention claimed is:

1. A method for performing a measurement of wear and friction characteristics of a material sample with an apparatus that includes a sample holder, a bushing dimensioned to accommodate the sample holder therein, a horizontal force sensor connected to the bushing, and a vertical force sensor connected to the sample holder at a first end thereof, the method comprising:

establishing contact between the material sample held in the sample holder at a second end of the sample holder and an auxiliary body;

and carrying out at least one of:

a) applying a vertical force to the first end with a rod pusher of the apparatus to reposition the sample holder vertically with respect to the bushing and with respect to a linear vertical bearing separating the sample holder from the bushing; and b) transferring said vertical force to the vertical force sensor through a horizontally-sliding element positioned between the rod pusher and the vertical force sensor, to at least reduce an amplitude of a tilting motion of the sample holder with respect to a first axis of the bushing caused by a relative motion between the sample and the auxiliary body when said relative motion is present.

2. The method according to claim 1, comprising generating said relative motion in a plane substantially transverse to the first axis along which said applying the vertical force is carried out.

3. The method according to claim 2, wherein said relative motion is one of a linear reciprocating motion along a second axis that is substantially transverse to the first axis and a motion along a curve in said plane.

4. The method according to claim 1, wherein said applying the vertical force to the first end of the sample holder includes applying the vertical force to the sample holder that is slidably retained in the linear vertical bearing in a fixed position in absence of said vertical force.

5. The method according to claim 1, comprising at least one of:

a) causing repositioning of said horizontally-sliding element in a plane substantially transverse to the first axis, along which said applying the vertical force is carried out, by generating said relative motion; and b) causing said repositioning while measuring a temperature of at least one of the sample and the auxiliary body.

6. The method according to claim 1, wherein the apparatus includes first and second horizontally-sliding elements positioned between the rod pusher and the vertical force sensor, and further comprising:

causing repositioning of said first and second horizontally-sliding elements in a plane substantially transverse to the first axis, along which said applying the vertical force is carried out, by generating said relative motion.

7. An apparatus for measurement of wear and friction characteristics of a material sample, the apparatus comprising:

a sample holder having a first end and a second end, the second end dimensioned to hold the material sample;

a bushing dimensioned to accommodate the sample holder therein to permit reversible repositioning of the sample holder along a first axis of the bushing;

a horizontal force sensor connected to the bushing;

a vertical force sensor operably connected to the sample holder at the first end thereof, a rod pusher configured to contact the first end in operation of the apparatus; and an apparatus sub-system comprising at least one of a) a linear vertical bearing disposed in the bushing and separating the sample holder from the bushing and b) a horizontally-sliding element disposed between the rod pusher and the vertical force sensor, said apparatus sub-system configured to at least reduce an amplitude of a tilting motion of the sample holder with respect to the first axis of the bushing caused when a relative motion is present between the sample and an auxiliary body brought in contact with the sample.

8. The apparatus according to claim 7, comprising an electrical motor generating a rotational motion and a cam configured to transform said rotational motion into said relative motion.

9. The apparatus according to claim 8, wherein said cam is configured to transform said rotational motion into at least one of (i) a linear reciprocating motion along a second axis that is substantially transverse to the first axis and (ii) a motion along a curve in a plane substantially transverse to the first axis.

10. The apparatus according to claim 7, further including sensors configured to measure a temperature of at least one of the sample and the auxiliary body.

11. An apparatus for measurement of wear and friction characteristics of a material sample, the apparatus comprising:

a sample holder having a first end with a ball bearing attached to the first end and a second end dimensioned to hold the material sample;

a bushing dimensioned to accommodate the sample holder therein to permit reversible repositioning of the sample holder along a first axis of the bushing;

a horizontal force sensor connected to the bushing;

a vertical force sensor operably connected to the sample holder at the first end thereof, a member between the vertical force sensor and the ball bearing, the member configured to contact the ball bearing in operation of the apparatus.

12. The apparatus according to claim 11, comprising an apparatus sub-system that includes at least one of a) a linear vertical bearing disposed in the bushing and separating the sample holder from the bushing, and b) a horizontally-sliding element disposed between the member and the vertical force sensor, said apparatus sub-system configured to at least reduce an amplitude of a tilting motion of the sample holder with respect to the first axis of the bushing caused when a relative motion is present between the sample and an auxiliary body brought in contact with the sample.

13. The apparatus according to claim 11, wherein at least one of the following conditions is satisfied:

a) the apparatus comprises an electrical motor configured to generate a rotational motion and a cam configured to transform said rotational motion into said relative motion;

b) wherein said cam is configured to transform said rotational motion into at least one of (i) a linear reciprocating motion along a second axis that is substantially transverse to the first axis and (ii) a motion along a curve in in a plane substantially transverse to the first axis; and c) the apparatus includes sensors configured to measure a temperature of at least one of the sample and the auxiliary body.

* * * * *